United States Patent [19]
Bay, Jr.

[11] Patent Number: 5,347,452
[45] Date of Patent: Sep. 13, 1994

[54] METHOD FOR PROVIDING A VISUAL DISPLAY OF CURRENT TRADING VOLUME AND CUMULATIVE AVERAGE TRADING VOLUME FOR PRESELECTED TIME INTERVALS

[76] Inventor: William P. Bay, Jr., 46 S. Saint Andrews Dr., Ormond Beach, Fla. 32174

[21] Appl. No.: 729,041

[22] Filed: Jul. 12, 1991

[51] Int. Cl.$^5$ .............................................. G06F 15/24
[52] U.S. Cl. ................................ 364/408; 340/825.26
[58] Field of Search ........................ 395/140; 364/408; 340/825.26, 825.27

[56] References Cited

PUBLICATIONS

Lewis, Brian K. "Investor's Advantage 1.02", Computer Shopper vol. 9, No. 2 p. 153/2, Feb. 1989, Abstract from Microsearch file of Orbit AN:89–053115.
Diascro, Stephen C. "Stock Trading System—Comp. Adv. for Serious Investor" PCM, vol. 6, No. 2, p. 140/1, Aug. 1988, Microsearch file of Orbit AN:-88–050477.
Colby, Robert W. "Trendline II", PC Magazine, vol. 5, No. 7, p. 154/2 Apr. 15, 1986, Abs. from Microsearch file of Orbit AN:86–033803.

*Primary Examiner*—Gail O. Hayes
*Attorney, Agent, or Firm*—James H. Beusse

[57] ABSTRACT

A method for displaying market trading volume in selected commodities for developing a priori knowledge of price trends from abnormal trading volume comprises a graph including a first set of sequential markers. Each first marker corresponds to a preselected time interval and has an amplitude representing average volume of trades of a predetermined item during a preselected time interval taken over a predetermined number of the preselected time intervals. The method further comprises generating a set of second markers substantially concurrently in time with the corresponding first markers and which are positioned on the graph in proximity to the corresponding first markers. Each second marker has an amplitude representing the volume of trades in the preselected item during the most recent preselected time intervals with the difference in amplitude indicative of trade volume deviation from average trade volume.

6 Claims, 4 Drawing Sheets

METHOD FOR PROVIDING A VISUAL DISPLAY OF CURRENT TRADING VOLUME AND CUMULATIVE AVERAGE TRADING VOLUME FOR PRESELECTED TIME INTERVALS

BACKGROUND OF THE INVENTION

The present invention relates to stock, bond, and commodity trading and, more particularly, to a method for providing a visual display of current trading volume and cumulative average trading volume for preselected time intervals in conjunction with trading price for each of a plurality of stocks, bonds, and commodities.

In general, traders of stocks, bonds, and commodities have relied on price as the primary guide to decisions about when to buy and sell. It has been recognized that volume in association with price is an indicator of whether a price is likely to increase or decrease. Unfortunately, volume information is not usually available from the various bond and commodity exchanges until at least after the exchange closes on any particular day. Increasing volatility of the bonds and commodities markets results in sometimes substantial price movements before volume information is available. Further, current volume information along with price information is not an accurate indicator of market direction. Thus, it would be advantageous to provide a method for developing volume information for bonds and commodities during current time intervals. It would also be advantageous to provide a method for correlating volume information with historical data for identifying abnormal variations in volume for bonds, commodities, and stocks.

SUMMARY OF THE INVENTION

Among the several objects and features of the present invention is the provision of a system and method for overcoming the above and other disadvantages of the prior art; the provision of a system and method which extrapolates trade volume from reported trade price; the provision of a system and method for displaying current trade volume against historical trade volume for each of a plurality of time intervals; and the provision of a system and method for forecasting trade volume in a selected time interval prior to expiration of the time interval.

The above and other objects, features, and advantages are attained in a system and method which extrapolates trade volume in a selected item by counting the number of trades occurring in that item from reported trade price. Each exchange provides current price information, i.e., each time a price is reported, it corresponds to a trade. The actual volume of the trade, e.g., 100 shares or 1000 shares, is provided for stocks but not for bonds and commodities. However, Applicant has found that the number of trades correlates relatively closely to the volume. In other words, given a standard distribution of trade volume over a selected time interval, there will be an average number of shares represented by each trade. Accordingly, Applicant can extrapolate from the reported price per trade to a volume of shares. However, Applicant has also found that volume information and price information alone are not predictable indicators of market direction. In particular, Applicant has found that trade volume tends to follow certain patterns in which volume is typically high at each extreme of a selected interval, for example at early and late hours of a day or at the beginning and end of a week. During intermediate time intervals, volume tends to be lower. Thus, a rise in volume at the end of a day may be a normal event and not indicative of any impending market change in the item. In order to utilize the current volume information, Applicant has developed a histogram of volume information for each of a plurality of selected time intervals. The histogram is displayed on a monitor of a computer system so that current trade volume can be juxtaposed with historical trade volume as trades occur. The computer system is coupled via modem to an exchange which provides pricing data as each trade occurs. Preferably, pricing information is displayed simultaneously with volume information so that an accurate assessment of market direction can be made. The system also extrapolates to a predicted volume in a time interval for each traded item based upon the number of trades occurring during the early portions of the time interval.

The display is preferably arranged so that historical volume for each time interval appears as an open rectangle aligned in the corresponding time interval and whose height corresponds to average trade volume for the period selected. Current volume is overlaid in or on the open rectangle as a vertical line having a height proportional to volume. The price data may be displayed on a separated line above but correlated with the volume data. Since the height of the line is easily compared to the height of the rectangle, the user can quickly ascertain if volume is above or below average and thus determine whether the price is likely to change or whether a price change is indicative of a market direction. Separate graphs for each traded item can be rapidly viewed using the computer system.

In addition to the display of current volume and historical volume for a preselected time interval, Applicant also provides a projected volume for the preselected time interval represented as a vertical line adjacent the current preselected time interval representation. Summation data for a day, week, or month, depending on the type of time chart being used, may also be displayed. For a chart which uses preselected time intervals of thirty minutes, the summation data may include an indicia of the previous day's total volume, historical data for the current day averaged over multiple time periods, an indicia of volume of trades totaled for the present day to the present time and a projection of the total volume at close of trade for that particular day.

BRIEF DESCRIPTION OF THE DRAWINGS

For a better understanding of the present invention, reference may be had to the following detailed description taken in conjunction with the accompanying drawings in which.

DETAILED DESCRIPTION OF THE INVENTION

Figure 1:
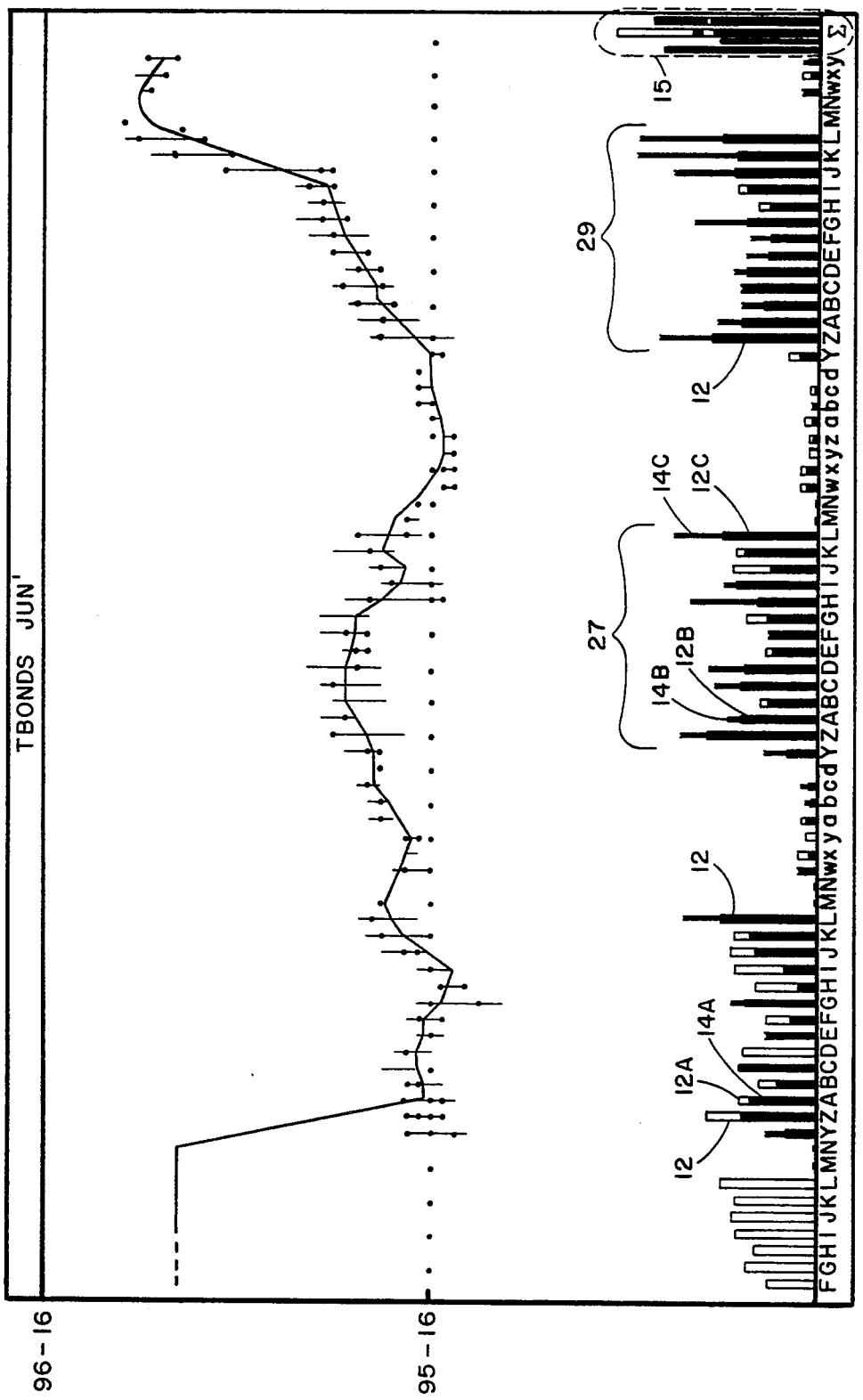
FIGS. 1 and 1a are graphs illustrating one form of display in accordance with the present invention.
Figure 2:
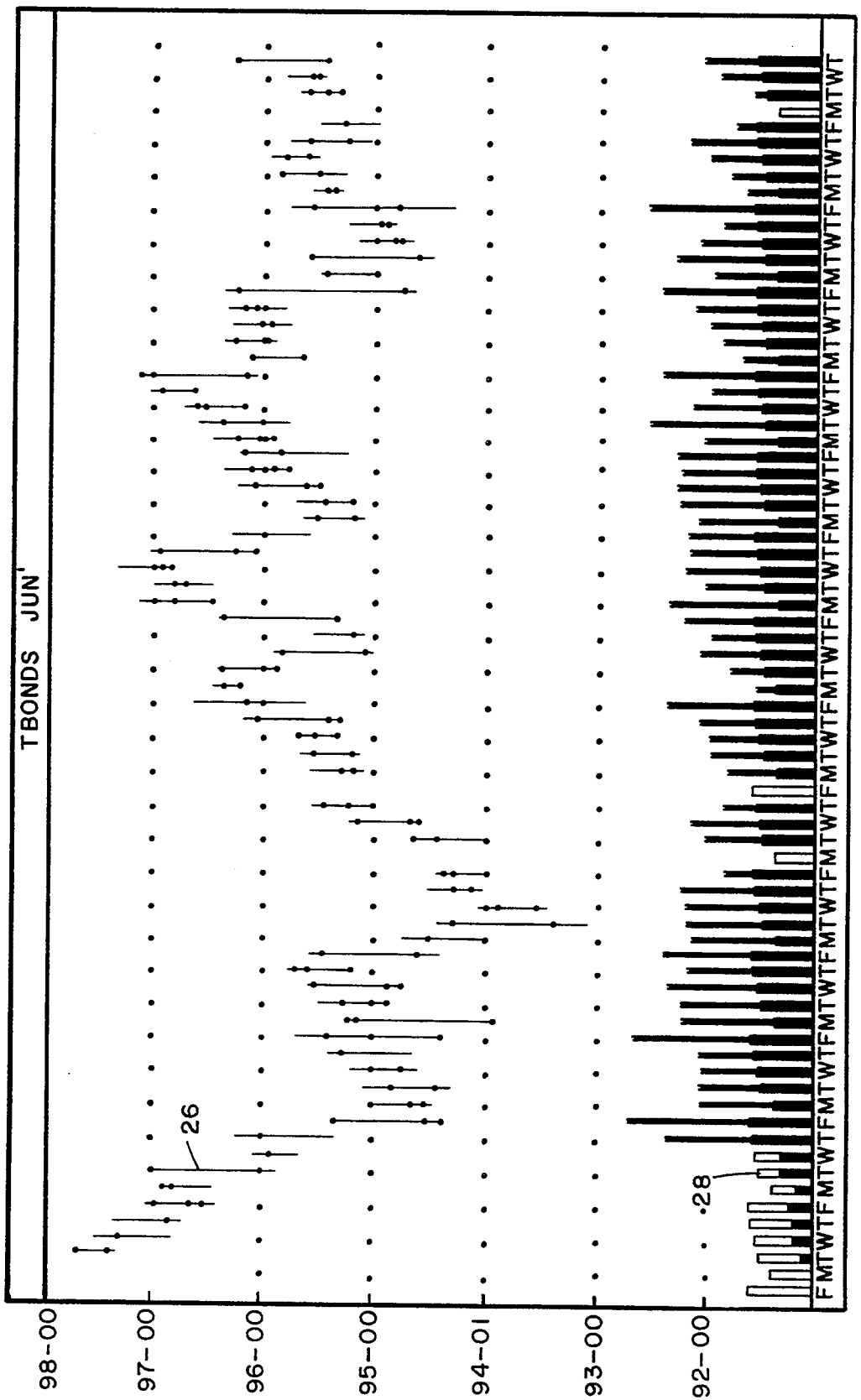
FIG. 2 is another graph illustrating another form of display in accordance with the present invention.

Referring generally to FIGS. 1 and 2, there is shown one form of display implementing the present invention. FIG. 1 illustrates price and volume information for TBonds over a period of three days with each volume indicia or marker 12 corresponding to a thirty minute time interval. Each of the time intervals are associated with a letter code A-Z in which conventional practice has assigned the letter A to indicate the time period from 8:20 a.m. to 8:50 a.m. at the Chicago Bond of Trade. The height or amplitude of each of the markers 12 represents a historical average volume of trade for the selected commodity during the selected time interval. For example, the marker 12A may represent the average trade volume in TBonds occurring between 8:20 a.m. and 8:50 a.m. on Monday averaged over a preselected number of weeks, such as, for example, the immediately prior eight weeks. Similarly, the marker 12B may represent the average trade volume in TBonds occurring between 8:20 a.m. and 8:50 a.m. on Tuesday averaged over an eight week period. Thus, not only does each interval marker amplitude represent an average volume during a preselected half-hourly interval, the amplitude represents average volume during that interval on a particular preselected day of the week. However, the average could be accumulated over the immediately preceding ten days without reference to a particular day of the week.

The importance of comparing market volume during a present time interval to average historical volume during the same time interval can be appreciated from the graph of FIG. 1. In general, volume tends to be heavier in the early and late hours and to be slower during the middle portion of each day although some commodities exhibit different characteristics. Deviations from the generality are seen to occur when particular market announcements are made or when significant news events occur. For particular commodities, trends can be readily seen by comparing historical data to current data. Applicant illustrates historical data using open rectangles having a preselected width and a height corresponding to volume. Current market activity is represented by solid markers, such as 14A, 14B, and 14C, extending through the hollow, rectangular markers 12A, 12B, and 12C. In instances in which the current volume exceeds the historical average volume, such as with markers 14B and 14C, the current volume marker resembles a wick protruding from a candle. Hence, the graphs of FIGS. 1 and 2 are referred to as Candlevolume ™ graphs. The particular design and arrangement of the markers 12 and 14 are selected to provide an easily distinguishable relationship between historical average volume and current volume. However, other forms of markers could be used, such as, for example, arranging the markers adjacent rather than as overlays.

Figure 1A:
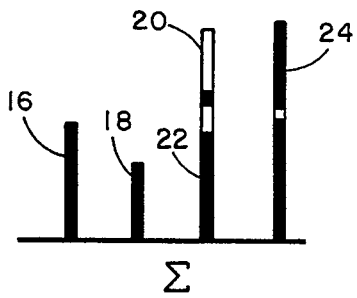

At the right hand of FIG. 1, there is displayed above the Σ indicator certain detailed information and projections for selected time periods or interludes. FIG. 1A is an enlarged view of the portion of FIG. 1 within the circled area 15. In the case of the illustrative thirty minute chart, bar 16 represents the projected market volume for the current time interval, bar 18 represents the preceding day's market volume for the current time interval, bar 20 represents the historical average market volume for the present day (not just the current time interval), marker 22 represents the current days total market volume of trades so far in the present day, and marker 24 represents a projection of market volume for today based upon volume to the present time. In FIG. 1, the markers 20, 22, and 24 have been compressed to fit onto the graph. Since they represent totals, their actual height would be substantially higher. In FIG. 1A, they are shown compressed by deleting a central portion. It will be apparent that other volume records and/or projections could be displayed. The intent is to provide a means for determining whether present market volume corresponds to normal volume or whether there is a trend, either up or down, in market volume which will indicate whether price of a commodity is stable or likely to move up or down. For example, higher than normal volume without any noticeable price change is generally an indicator of a selling market and a precursor of falling prices. Furthermore, if prices are changing, lower than normal volume generally indicates that the price change is likely to reverse. Various other predictions can be made by comparing volume activity with price data. As additional examples, volume above normal and price dropping indicates a general exodus from a particular commodity while volume below normal and price rising indicate short seller covering.

All of the indications to be gleaned from the market volume information generated by Applicant requires some coordination with commodity price information. As is well known, such price information is provided to stock and commodity brokers concurrently with their reporting at the exchange. As shown in FIGS. 1 and 2, this price information is displayed with volume information for each time interval. The price information is preferably displayed with opening and closing values along with the range of excursion. For example, in FIG. 2, marker 26 indicates an opening price of June TBonds at 97 and a closing price at 96 on a Tuesday. The price ranged from a high of 97 to a low of about 95.875 (expressed as a percentage of discounted value). The trade volume for that day was less than normal volume as shown by the marker 28.

The summation information described with respect to FIG. 1 is also available for the longer term data of FIG. 2. The data can be presented in any desirable form, for example, daily projections or weekly projections. Given a first interval of trading, for example, one hour, the day's projection merely requires multiplying by the number of trading hours to develop a first approximation. However, as noted with respect to FIG. 1, trading tends to be higher at early hours and slower during midday. Accordingly, the projection may be normalized by using an average multiplier, e.g., 6.5 for an eight hour trading day. It should also be recalled that the market volume is based upon "tic counts" i.e., number of transactions rather than actual commodity volume. The tic counts are reported merely as a trade at a given price per unit. However, Applicant has found that tic counts are representative of actual volume. Further, in the case of stocks, the actual volume is reported by the exchange so that the markers such as 14 represented actual volume.

The value of the present invention can be seen in the trading activity occurring during the final two days depicted in FIG. 1. The day indicated at 27 shows volume spurts occasionally exceeding normal and sometimes less than normal. The price during the day sometimes increased but overall tended to drop. The lack of any sustained volume trading indicates a lackluster market. However, on the following day there was sustained higher volume and price increases. The sustained volume justifies entering the market on an upswing knowing that price will continue to rise. The investor can then ride the rising price until volume falls to or below normal at which point price will generally have peaked.

Figure 3:
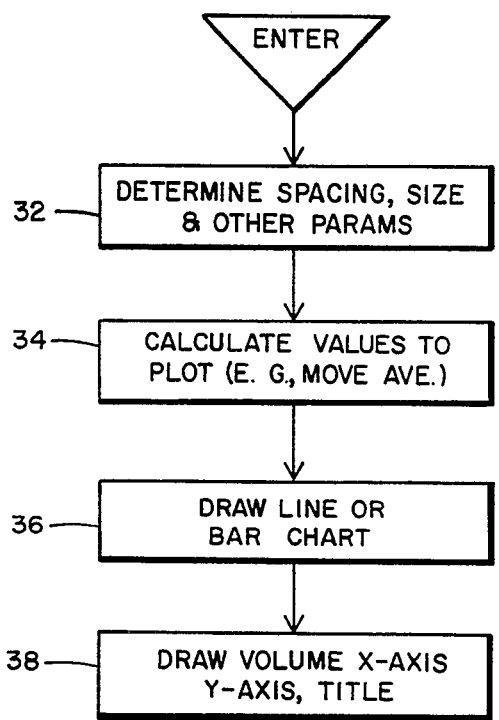
FIGS. 3-5 are flowcharts illustrating a method for implementing the graphs of FIGS. 1 and 2.
Figure 4:
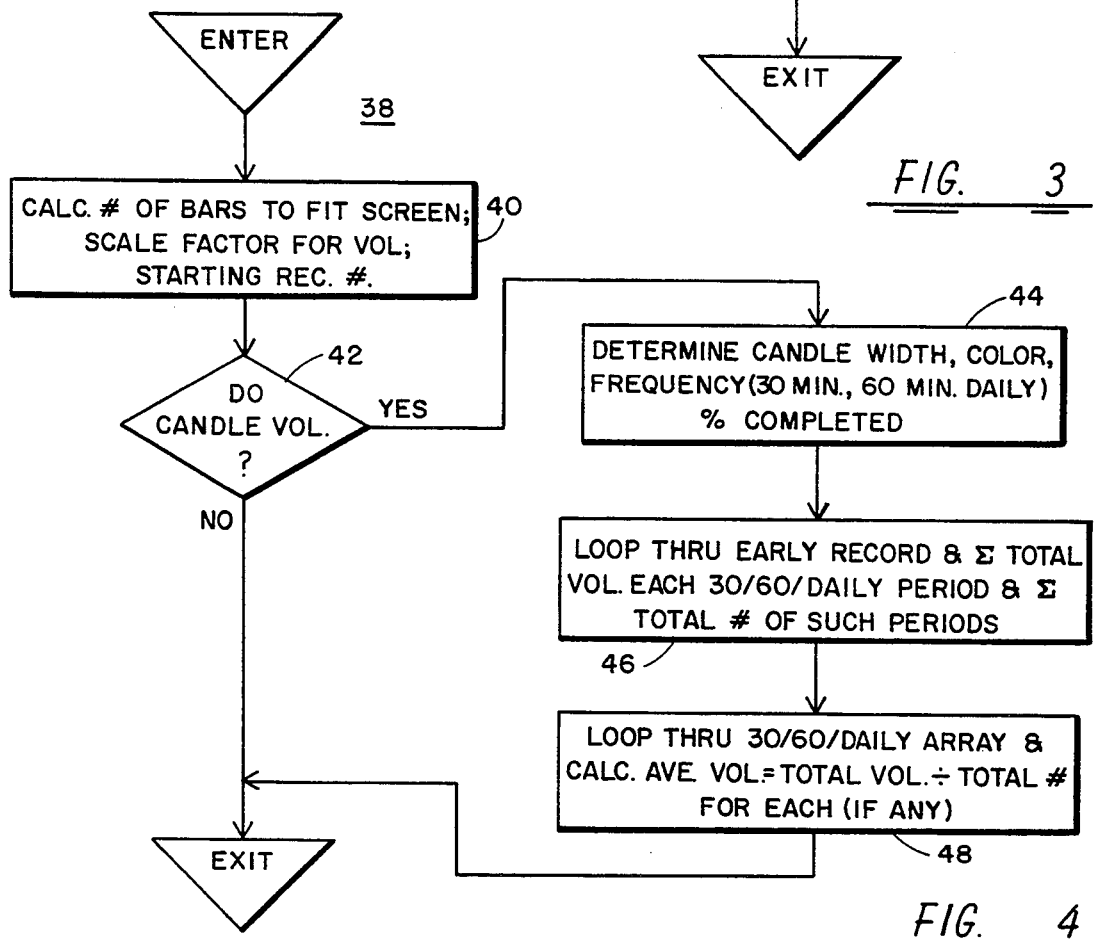
Figure 5:
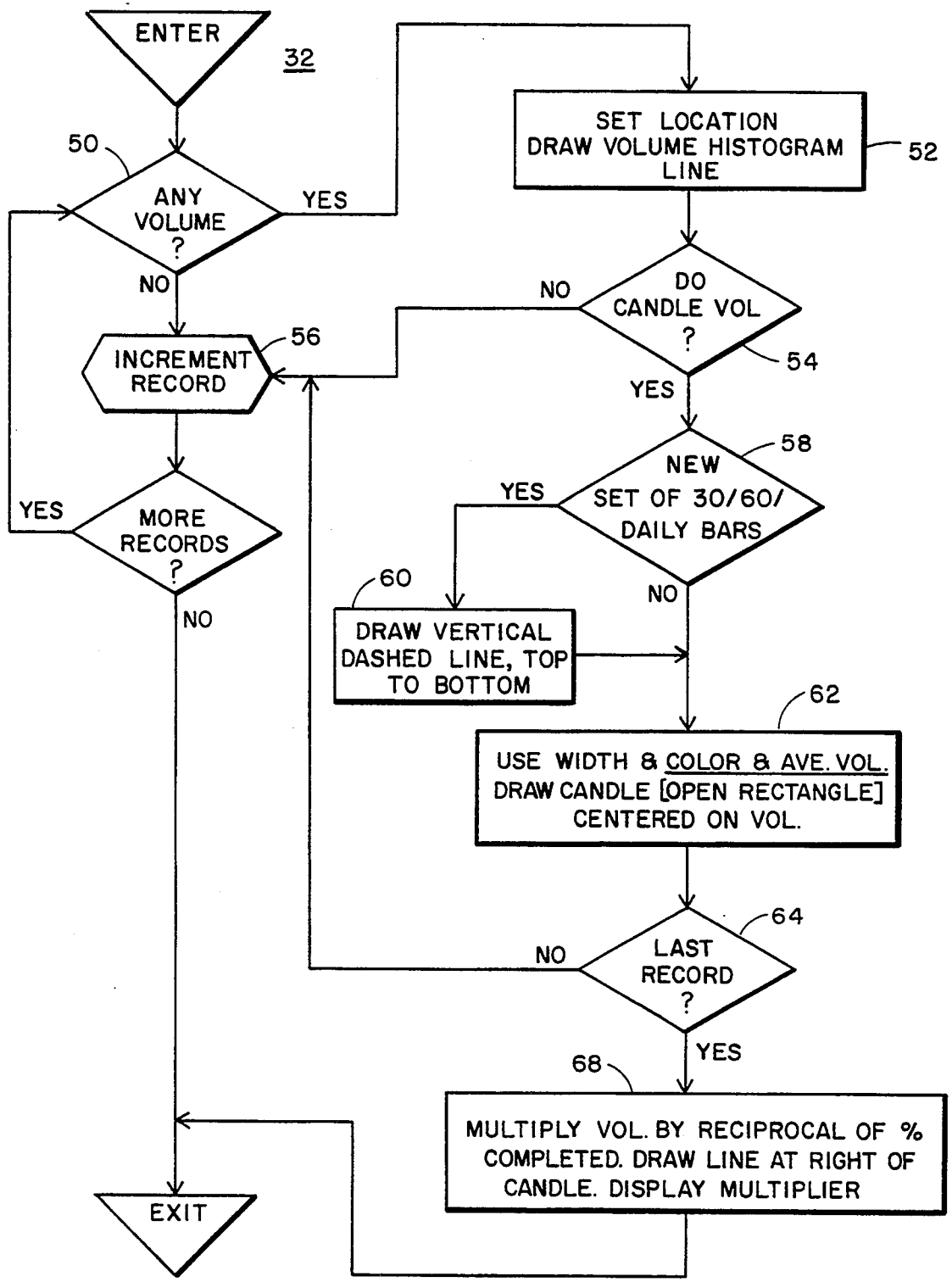

Turning now to FIGS. 3-5, there is shown a simplified flowchart for a computer program for implementing the present invention on a conventional IBM-DOS type computer. An overview program is shown in FIG. 3 starting with a program open block 30. The program first determines spacing, size, and other parameters for the graph to be created, block 32. Values to plot are then calculated, block 34. The type of graph, i.e., line or bar chart, is next determined, block 36, and then the program steps to an execute block 38 which draws the graph.

FIG. 4 expands on block 32. At block 40, the program calculates the number of markers (bars) to fit the screen display, the scale factor for volume as a function of amplitude of the marker and the starting record number. At decision block 42, the program determines if a Candlevolume TM graph is to be drawn. If so, the program steps to block 44 where candle width, color, and frequency (i.e., thirty minute, sixty minute, daily, etc., time intervals) are set. At block 46, the program loops through each record and sums the total tic count/volume for each time interval and for the total number of intervals. At block 48, the program computes the average historical volume for the selected number of past time intervals and then exits with all the computed parameters available to the display program, FIG. 3.

FIG. 5 expands on block 38 and illustrates one way in which the graph of Candlevolume TM is generated. At block 50, the program determines if any volume in a selected commodity has been generated. If any has, the program sets the location for drawing the volume histogram lines, block 52. Next, decision block 54 determines if Candlevolume TM is to be drawn. If not, the program steps to block 56 and increments to a new record number (another commodity). Else, the program increments to block 58 to select a new or existing interval set. If a new interval set (indicating a new day, for example), the program calls for a broken vertical line on the graph, block 60. Thereafter, or if no new set is selected, the program draws a candle line (volume line) centered on the average volume for the selected interval, block 62. The program then loops via decision block 64 to block 56 until all records have been processed. Note that block 56 increments the record number while decision block 66 decides if more records are to be processed. Block 68 following decision block 64 completes housekeeping requirements after the last record is processed including multiplying volume of trading in all commodities by the reciprocal of the percent completed, drawing a line to one side of the graph and displaying the multiplier.

Appendix A attached hereto is a listing in source language of a computer program for implementing the function flowchart of FIGS. 3-5.

It will be apparent that other programs are readily devised to create graphs of the type described and that some commercially available graphing programs can be adapted to display the data in a form similar to that of FIGS. 1 and 2. It is not intended that the invention be limited to the particular format shown in FIGS. 1 and 2 but that it be interpreted in the full spirit and scope of the appended claims. As described above, Applicant's invention comprises the development of volume indicators and their display in such a manner that traders can anticipate price trends from comparison of present trading volume against historical trading volume during similar time intervals. Further, while Applicant has referred to one historical time interval as being eight weeks, other longer and shorter time periods may be appropriate for different commodities and some time intervals may be variable. For example, the illustrative TBond market for June bonds disappears the first of July and the market switches to September TBonds. The accumulated historical data for June TBonds may have no value with respect to September TBonds. Further, there is usually an initial surge on three month TBonds at the beginning of each cycle, e.g., the beginning of July for September TBonds, which surge may not accurately forecast sales during similar intervals as September nears.

The pricing information displayed on each graph of FIGS. 1 and 2 is provided by the respective market exchange. A personal computer equipped with a modem can be used to obtain this data at a fee from the exchange in a well known manner.

APPENDIX A

```
'''''''''''''''''''''''''''''''''''''''''''''''''''''''''''''''''''''''''''
'                                                                          '
'COPYWRITE 1986-1991    WINdoTRADEr(tm)    L. A. Ehrhart                   '
'                                                                          '
'   PARTIAL SOURCE CODE LISTING FOR CANDLE VOLUME.                         '
'                                                                          '
'   '......  indicates omitted code                                        '
'                                                                          '
'                                                                          '
'''''''''''''''''''''''''''''''''''''''''''''''''''''''''''''''''''''''''''

SUB DoGraph STATIC

IF QuickDisplay% = 8 AND BillsVol% THEN

'''BillsVol% is permission switch for CANDLE VOLUME

QwkStartTimeAdjust% = StartTimeAdjust%(QuickContents%)
              ThirtySixtyMin% = 30
              IF PageWindo%(DispType, Page%, Awindo%) = 5 THEN
                    ThirtySixtyMin% = 60
              END IF A1     CurrentMin% = LastTradeTime%(QuickContents%) MOD 100
       CurrentMin% = (CurrentMin% - QwkStartTimeAdjust% + 1200) MOD ThirtySixtyMin%
       IF CurrentMin% < 5 THEN
```

```
        CurrentMin% = 5
    END IF
    VolCandleAdj! = ThirtySixtyMin% / CurrentMin%
    DoVolCandle% = Yes '''DoVolCandle% is switch indicating whether to do CANDLE VOL on this displa ELSE
    DoVolCandle% = No
END IF BeginningRecord% = BegRecHold%(Awindo%)
EndingRecord% = EndRecHold%(Awindo%)

'......

CALL GetQwkVariables
QuickMidPoint% = ConvertColsToModeZero%((RawLeftCol% + RawRightCol%) ± 2)
ExpanFact% = -1 * (-2 + do.LTA.DISPLAY(Page%, Awindo%))
MarkingLineSpacing% = (2) ² ExpanFact%
IF ExpanFact% > 2 THEN CandleSpacing% = do.LTA.DISPLAY(Page%, Awindo%)

'''CandleSpacing% sets width of candle sticks

DoVolCandleSpacing% = do.LTA.DISPLAY(Page%, Awindo%)

'''DoVolCandleSpacing% sets width of CANDLE VOL

ELSE
    CandleSpacing% = No
    DoVolCandleSpacing% = No
END IF

HowMany% = EndingRecord% - BeginningRecord% + 1
END IF

IDummy% = (RawRightCo  - RawLeftCol% - 3 * Marki  LineSpacing%) ± MarkingLineSp
IF IDummy% < HowMany% THEN
    BeginningRecord% = EndingRecord% - IDummy%
END IF IF MarkingLineSpacing% < 8 - 8 * do.LTA.DISPLAY(Page%, Awindo%) THEN
    IF ClearViewPort% = 2 THEN
        BackOff% = Yes
    END IF
END IF IF NOT Candle% THEN
    CandleSpacing% = No
END IF

'......

IF TypeOfGraph% = BarChart THEN
        OneForBarTwoForLine% = 1
        GOSUB DoBarChart
        GOSUB DrawFibLines
    ELSEIF TypeOfGraph% = LineChart THEN
        OneForBarTwoForLine% = 2
        GOSUB DoBarChart
        GOSUB DrawFibLines
    ELSEIF TypeOfGraph% = MovingAverageChart THEN
        REDIM MovAvePrice%(NumberOfMovingAverages%(Awindo%), MaxEntry%)
        GOSUB DoMovingAverage
        GOSUB DrawFibLines
    '''ETC

'......

GOSUB DoTitleAndRange

'......

GOTO DoGraphEnds
```

DrawBarChart:

'......

```
IF DoVolCandle% THEN '12/15 BILL BAY CANDLE VOLUME
    REDIM Ave30Ct%(0 TO 30)
    REDIM Ave30Vol&(0 TO 30)
END IF FOR QItem% = BeginningRecord% TO EndingRecord%
    IColor% = IColorHolder%
    UseDoVolCandleAdj% = No

'......

IF DoGraphicsMFI% OR DoVolCandle% THEN

'......
```

FOR CalcMFI Index% = BeginningRecord% To Ending Record%

Got
7-27-94

A2
```
            IF DoVolCandl . THEN '12/15 BILL BAY CANDLE
                QwkDayOfWeek% = DayOfWeek%(CalcMFIIndex%
                IF QwkDayOfWeek% < 0 THEN 'month and day
                    QwkDummy% = -1 * QwkDayOfWeek%
                    QwkDummy% = QwkDummy% MOD 1000    'rec
                    QwkDummy30% = QwkDummy% MOD 30
                    Ave30Ct%(QwkDummy30%) = Ave30Ct%(Qwk
                    Ave30Vol&(QwkDummy30%) = Ave30Vol&(Q
                END IF
            END IF
        END IF
NEXT
```

A3
```
        IF DoVolCandle% THEN '12/15 BILL BAY CANDLE VOLUME
            FOR QwkDummy30% = 0 TO 30
                CountDummy% = Ave30Ct%(QwkDummy30%)
                IF CountDummy% THEN
                    Ave30Vol&(QwkDummy30%) = Ave30Vol&(QwkDummy3
                END IF
            NEXT
        END IF

'......

IF DoVolCandle% THEN
            QwkDayOfWeek% = DayOfWeek%(QItem%)
            IF QwkDayOfWeek% < 0 THEN 'month and day
                QwkDummy% = -1 * QwkDayOfWeek%
                QwkDummy% = QwkDummy% MOD 1000    'recnum
                QwkDummy30% = QwkDummy% MOD 30
```

B2
```
                VertDispClose% = Ave30Vol&(QwkDummy30%)
                VertDispClose% = VertDispClose% * AvailableRowsForVolume
                VertDispClose% = RawBottomRow% - VertDispClose%
                'volume line will be at HorizontalCount% + 1
                LINE (HorizontalCount% + DoVolCandleSpacing%, RawBottomR
spClose%), QwkLineInsideColor%
                LINE (HorizontalCount% + DoVolCandleSpacing%, VertDispCl
ertDispClose%), QwkLineInsideColor%
                LINE (HorizontalCount% + 2 - DoVolCandleSpacing%, RawBot
, VertDispClose%), QwkLineInsideColor%
                IF YestQwkDummy30% > QwkDummy30% THEN    'new day
                    LineStyle% = &H8000
                    LINE (HorizontalCount%, RawTopRow% + QwkCharHeight%)
QwkBorderColor%, , LineStyle%
                    LineStyle% = -1
                END IF
            END IF YestQwkDummy30% = QwkDummy30%
```

B1
```
            IF QItem% = EndingRecord% THEN
                UseDoVolCandleAdj% = Yes
            END IF
        END IF
```

```
        GOSUB MarkXaxis

IF BarInterval(QuickContents%) > 0 THEN
          IF (SSumation!(QItem%)) <> 0 THEN
```

6-04-94  IF (SSummation!(QItem%)) <> 0 Then
7-27-94  IF (SSummation!(QItem%)) <> HighestPRICE THEN

~~IF AUTO.REFRESHING = AUTO AND ZEROITEMS%PLACE~~

IF AUTO.REFRESHING = AUTO AND ZEROITEMS% <> PLACE TO START% Then

GOSUB GETKWKVARIABLES

```
            ELSE
              VertDispClose% = INT(SSumation!(QItem%))
              C dVolColor% = QwkLineBordei   1or%
              XA% = HorizontalCount% + 1
              XB% = HorizontalCount% + 1
              YB% = RawBottomRow% - 1
              GOSUB MakVolBar IF UseDoVolCandleAdj% THEN '''UseDoVolCandleAdj% is switch for last PROJECTED volum B2              XA% = XA% + 1 - DoVolCandleSpacing%
                XB% = XB% + 1 - DoVolCandleSpacing%
                VertDispClose% = INT(SSumation!(QItem%) * VolCandleAdj!)
                CandVolColor% = QwkLineImpColor%
                GOSUB MakVolBar
              END IF
            END IF
          END IF
        END IF
      NEXT
      RETURN

'......

MarkXaxis:
IF GetOutQuick% = AUTO OR (AUTO.REFRESHING AND QItem% < EndingRecord%) THEN
    '''this keeps footing from flickering once printed
ELSEIF DoVolCandle% THEN       '12/15 BILL BAY CANDLE VOLUME
ELSE
    LINE (HorizontalCount%, RawBottomRow% - 1)-(HorizontalCount%, RawBottomRow% - 5)
    IF DayOfWeek%(QItem%) MOD 10 = 2 THEN
        LINE (HorizontalCount%, RawBottomRow% - 1)-(HorizontalCount%, RawBottomRow%
        LINE (HorizontalCount%, RawBottomRow% - 6)-(HorizontalCount% + 3, RawBottomR
        LINE (HorizontalCount% + 3, RawBottomRow% - 3)-(HorizontalCount% + 6, RawBot
        LINE (HorizontalCount% + 6, RawBottomRow% - 6)-(HorizontalCount% + 6, RawBot
    END IF
END IF
RETURN

'......

MakVolBar:
                VertDispClose% = VertDispClose% * AvailableRowsForVolume!
                VertDispClose% = RawBottomRow% - VertDispClose%
                YA% = VertDispClose%
                IColor% = CandVolColor%
                GOSUB MakLineCall
RETURN MakLineCall:
        IF QwkScrnMode% >= 2 THEN
            GOSUB MakeYELineCall
        ELSE
            GOSUB MakeYLineCall
        END IF
RETURN
```

```
MakeYELineCall:
    CALL SETLINESTYLE(LineStyle%)
    CALL UNCALCATTR(Fore%, Back%, IColor%)
    CALL ELINE(XA%, YA%, XB%, YB%, Fore%)

MakeYLineCall:
    LINE (XA%, YA%)-(XB%, YB%), IColor%
RETURN

'......

DoGraphEnds:

'......

CALL GetQuickContents
    AUTO.REFRESHING = No

END SUB
```

What is claimed is:

1. A method for displaying market trading volume in selected commodities for developing a priori knowledge of price trends from abnormal trading volume comprising the steps of:

gathering historical data representative of an average volume of trades of a predetermined market item for each of a plurality of preselected time intervals;

generating a graph comprising a set of first sequential markers, each of the first markers corresponding to one of the preselected time intervals and having an amplitude representative of the average volume of trades of the predetermined item during each preselected time interval taken over a predetermined number of the preselected time intervals;

generating a set of second markers substantially concurrently in time with the corresponding preselected time intervals and positioning the second markers on the graph in proximity to corresponding ones of the first markers, respectively, each of the second markers having an amplitude representative of the volume of trades in the preselected item during the most recent ones of the preselected time intervals with the difference in amplitude being indicative of trade volume deviation from average trade volume;

comparing the amplitude of the second markers to the amplitude of corresponding ones of the first markers to determine differences therebetween; and predicting price movements in the predetermined item from the amplitude differences between the first and second markers.

2. The method of claim 1 and including the further steps of:

displaying reported trading prices in corresponding relationship with trading volume for each preselected item; and projecting trends in the trading price from the step of comparing the amplitude or the second and first markers.

3. The method of claim 1 and including the further step of:

displaying a third marker for each preselected item representative of trading volume in such preselected item for a predetermined number of consecutive time intervals during a prior selected time interlude;

generating a fourth marker adjacent said third marker representative of the current trading volume in the preselected item during a set of consecutive time intervals corresponding to said predetermined number of consecutive time intervals; and using the third and fourth markers to predict trade volume over an extended time interval for establishing a projection of price trend over the extended time interval.

4. The method of claim 3 wherein each of said time intervals comprises a fraction of a day and said time interlude comprises a day.

5. The method of claim 1 and including the step of:

generating a projected trading volume in said item during a predetermined time interlude from trading volume occurring during a portion of the time interlude;

comparing the projected trading volume to the historical trading volume for the predetermined time interlude; and projecting price trends in the predetermined market item from any differences obtained by said step of comparing the projected trading volume to the historical trading volume.

6. The method of claim 1 and including the step of:

generating another marker representative of projected trading volume in the preselected item during the current time interval by dividing the instantaneous total trading volume during the current time interval by the fraction of the time interval having past when the instantaneous total volume is obtained.

* * * * *